INVENTOR.
ROBERT E. RAYMOND
BY
*Schmieding & Fultz*
ATTORNEYS

INVENTOR.
ROBERT E. RAYMOND
BY
Schmieding & Fultz
ATTORNEYS

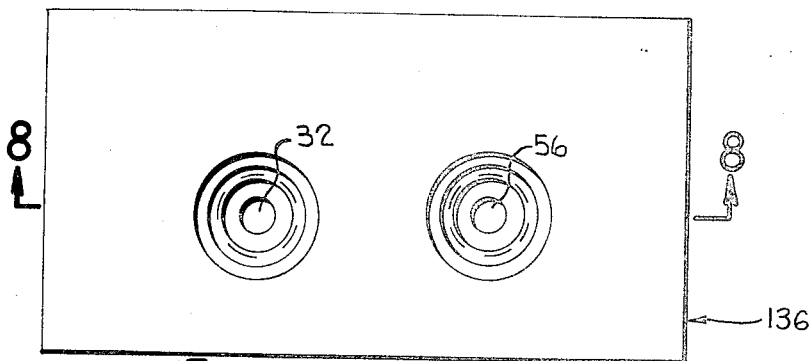
FIG.4
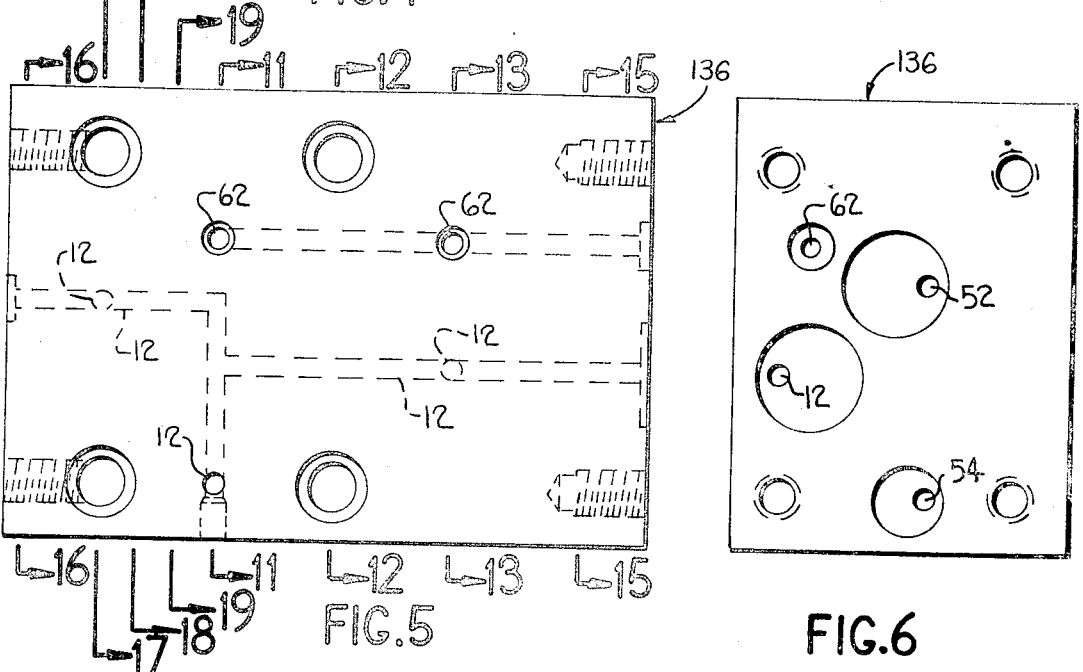
FIG.5
FIG.6
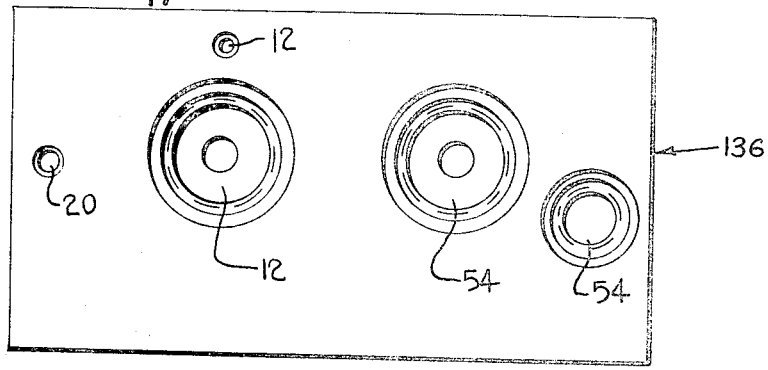
FIG.7

INVENTOR.
ROBERT E. RAYMOND
BY
Schmieding & Faltz
ATTORNEYS

United States Patent Office 3,543,513
Patented Dec. 1, 1970

3,543,513
CONTROL APPARATUS FOR HYDRAULIC SYSTEMS
Robert E. Raymond, Zanesville, Ohio, assignor to International Basic Economy Corporation, New York, N.Y., a corporation of New York
Filed Feb. 19, 1969, Ser. No. 800,657
Int. Cl. F15b 1/02
U.S. Cl. 60—51
10 Claims

ABSTRACT OF THE DISCLOSURE

A control apparatus for hydraulic systems for variably establishing and holding constant pressure ranges between two preselected pressure values for accumulator or energy storing systems.

---

This invention relates to control apparatus for hydraulic systems, and more particularly to an apparatus for variably establishing and holding constant pressure ranges between two preselected pressure values for accumulator or energy storing systems.

In general, the apparatus of the present invention is adapted to sense an accumulator pressure and set a preselected high system unloading pressure, and also a preselected low reset or loading pressure, independently, thereby effectively establishing a preselected variable differential for unloading and loading of the pressure control systems. Basically this apparatus is used on accumulator or energy storing systems for holding a preselected reasonably constant pressure range between two values which can be termed a variable differential pressure range. Hence the apparatus may be referred to as a variable differential control valve.

There are many designs of conventional unloading valves which incorporate unloading valve elements in the form of poppets or poppet spool arrangements, or spools which are merely operated by a pilot section so as to move to an open position when the pilot pressure is dropped drastically by the action of the pilot section. Essentially such conventional unloading valves can be termed two elements types of valves which include a simple pilot trigger mechanism that performs an unloading action on a main valve for dropping the pressure in the system, or for unloading a pump flow.

Such conventional control apparatus heretofore available for energy storing systems are adapted to establish fixed differential pressure ranges where the unloading and loading pressures are determined by fixed parameters within the apparatus which parameters cannot be changed. Basically the pressure responsive areas on the poppet and spool elements, and the bias spring rates of such conventional devices are fixed during manufacture so as to determine such fixed differential pressure operation. These conventional devices, or unloading valves have presented inherent disadvantages and historically have been one of the most difficult of all valve types to manufacture so far as obtaining a device with accurate reliable operational characteristics. The fundamental difficulties arise because such prior devices utilize a pilot section to trigger the valve that is operated by a delicate force balance chain involving a piston that is exposed to accumulator pressure of a slightly greater area than the area of the pilot poppet valve in said pilot section. The pressure differential is basically determined by such difference in areas, which is necessarily very minute; i.e. in the manner of thousandths of an inch in diameter of the firing piston and poppet valve in the pilot section.

In operation of such prior devices the pressure differential is accomplished by the fact that as the pressure rises on the accumulator measuring piston a pressure unbalance occurs in the top side of the valve which causes the whole poppet to move slightly further than it would have under direct pressure operation. This essentially drops the back pressure on the valve and causes an unloading action. Hence the pressure differential is interrelated with the firing force levels in the pilot section, with the result that as the pressure differential is made to be small, so is the firing force available. Therefore, an essentially zero differential unloading valve is inherently not possible since at zero differential there would be no firing force. In accordance with such prior fixed differential characteristics it is not possible to adjust the unloading and loading action to various systems with flexibility since it is necessary to manufacture and install new parts to establish different pressure values and ranges.

It will now be understood that it is highly desirable to provide an unloading valve adapted to provide "variable differential" pressure control for a fluid system.

It should further be pointed out that the conventional fixed differential unloading valves are sensitive to manufacture, usually because this valve will "hang-up" or stick at the unloading pressure value in much the same manner as a relief valve holding pressure, with friction effecting sensitivity of operation whereby the loading pressure value varies due to small force additions in the pilot section.

In accordance with the present invention a novel variable differential unloading valve is provided which incorporates a pilot section that consists of four basic pilot devices that perform four basic pilot functions.

Although the main unloading valve means can be in various forms in the present disclosure a balanced spool valve is shown as a typical example, with the pressure at each end of the spool being controlled by the above mentioned four element pilot section in such a manner as to force the unloading valve to an open position responsive to a signal, or to a closed position when loading is required.

In achieving variable differential pressure control it is necessary to provide two separate pressure settings, with provisions to independently adjust a sensing valve means for a higher unloading pressure as well as a sensing valve means for a lower loading pressure. This means that one can variably set a broad or narrow pressure margin which is herein termed the variable differential for the system to load and unload.

Another advantage of such variable differential system is that it is possible to set the two pressure values very, very close since the principle of the present invention does not depend upon the delicate balancing of areas on mechanical parts within the trigger mechanism. Moreover, each component acts independently in a logic control system in the form of a three-way switch valve that does not permit interaction. Therefore, the loading and unloading pressure values can be set extremely close depending upon gain characteristics of amplifier valve components that can be selected.

It is therefore an object of the present invention to provide a novel unloading valve apparatus that includes two separately adjustable pressure sensing valve means that provide variable differential pressure control for an energy storing hydraulic system.

It is another object of the present invention to provide an unloading valve apparatus of the type described that is adapted to accurately establish extremely close pressure differentials between selected loading and unloading pressure values.

It is another object of the present invention to provide an unloading valve apparatus of the type described that includes two separate pressure sensing valve means that also function as preamplifier valves that independently draw and set control flows in a logical sequence of events.

It is another object of the present invention to provide an unloading valve apparatus of the type described that includes a switch valve means that performs a "memory" function by controlling an unloading valve means and high pressure sensing valve means such that the unloaded condition of the apparatus will not be effected as system pressure drops until such pressure drops to a predetermined lower loading pressure value.

It is another object of the present invention to provide an unloading valve apparatus of the type described that includes a pilot flow limiting valve means that functions to shield a low pressure sensing valve means such that excessive flow cannot occur through said sensing valve means and cause false triggering.

It is another object of the present invention to provide an unloading valve apparatus of the type described that includes damping components for the basic system apparatus which components function to prevent erratic oscillations and chatter.

Further objects and advantages of the present invention will be apparent from the following description, reference being had to the accompanying drawings wherein a preferred form of embodiment of the invention is clearly shown.

In the drawings:

FIG. 4 is a bottom elevational view of a housing for sensing valve portions of the apparatus of the preceding figures;

FIG. 5 is a front elevational view of the housing for sensing valve portions of the apparatus of the preceding figures;

FIG. 6 is a side elevational view of the housing for sensing valve portions of the apparatus of the preceding figures;

FIG. 7 is a top elevational view of the housing for sensing valve portions of the apparatus of the preceding figures;

Figure 2:
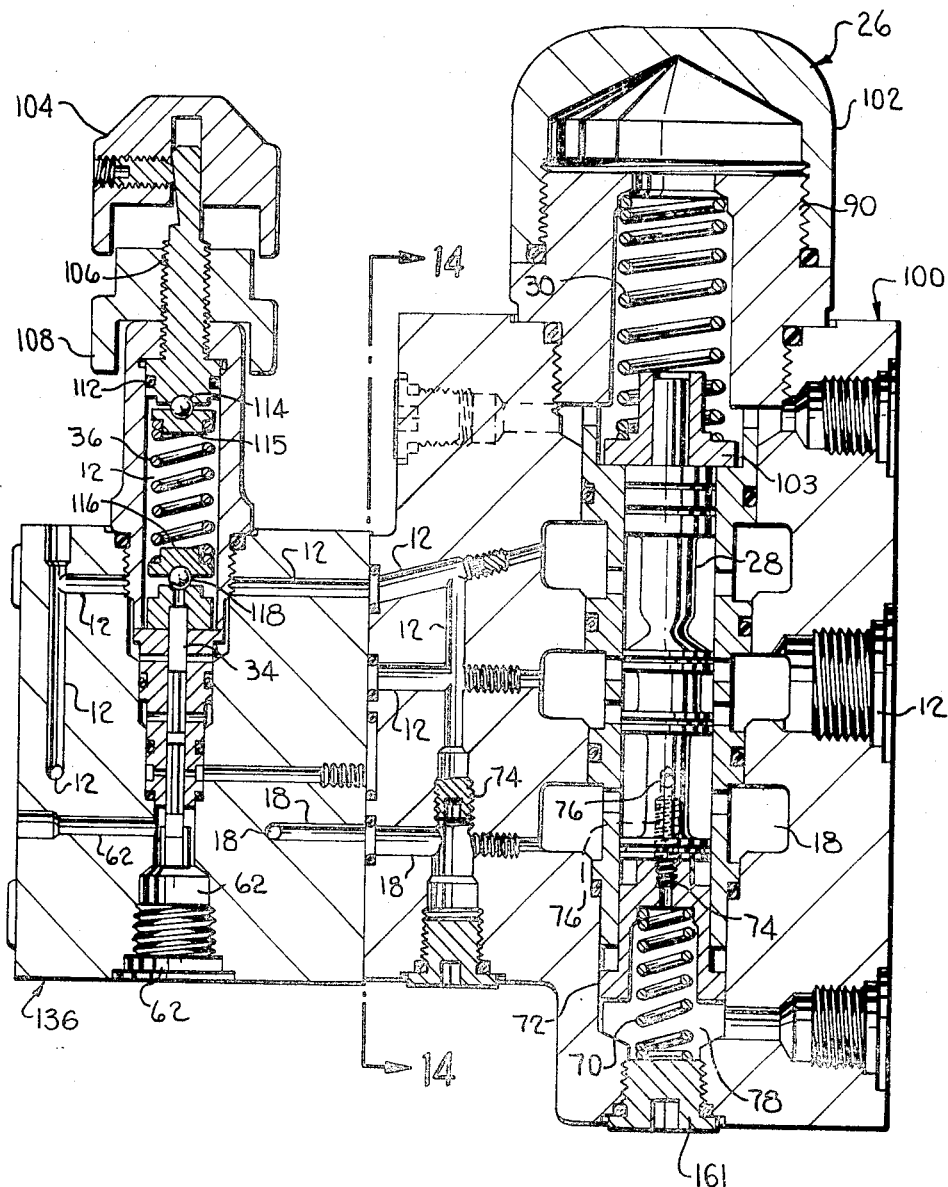
FIG. 2 is a side sectional view of the variable differential unloading apparatus of FIG. 1, the section being taken along a vertical plane through the center of an unloading valve portion of said apparatus.
Figure 14:
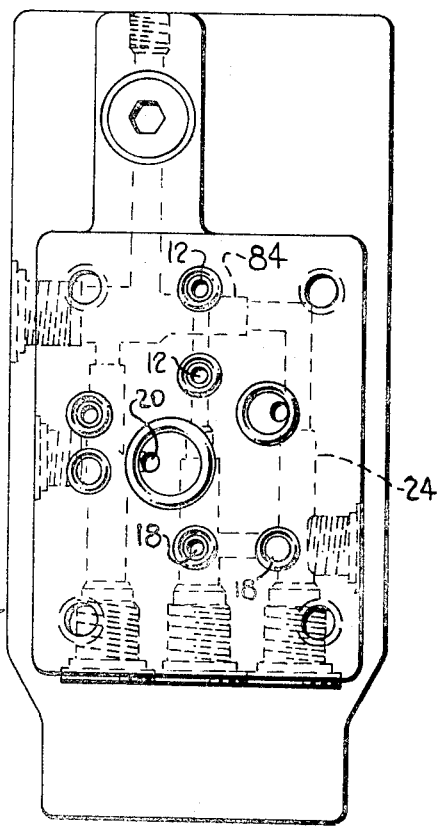
Figure 15:
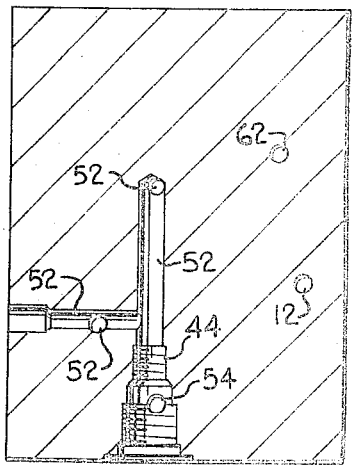
Figure 16:
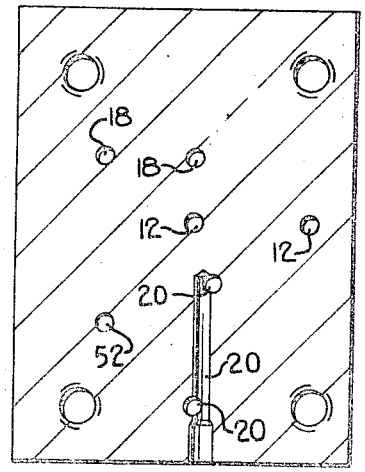
Figure 17:
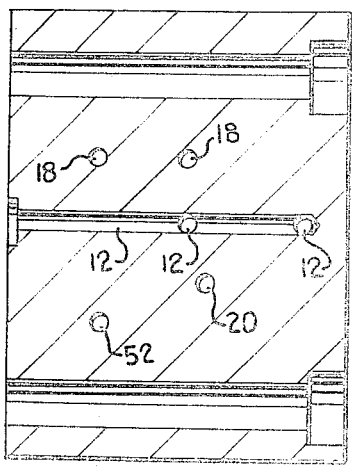
Figure 18:
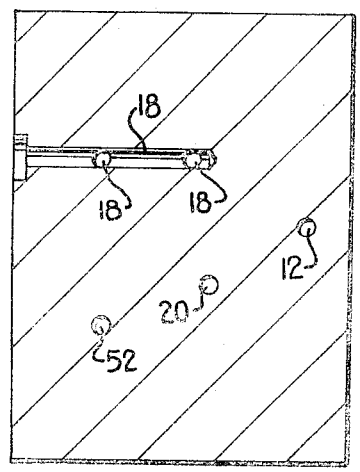
Figure 19:
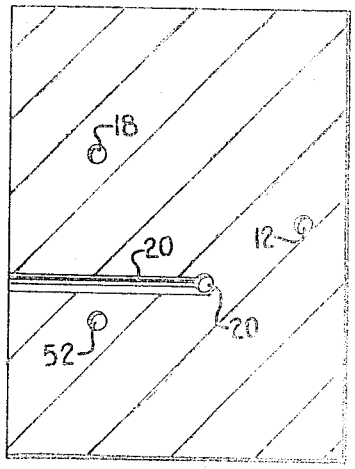

FIGS. 11, 12, 13, 15, 16, 17, 18, and 19 are sectional views through the housing of FIGS. 4–10, said sections being taken along the respective lines 11, 12, 13, 15, 16, 17, 18, and 19 of FIG. 5; and FIG. 14 is a front view of a housing for an unloading value portion of the apparatus, the section being taken along the line 14—14 of FIG. 2.

Figure 1:
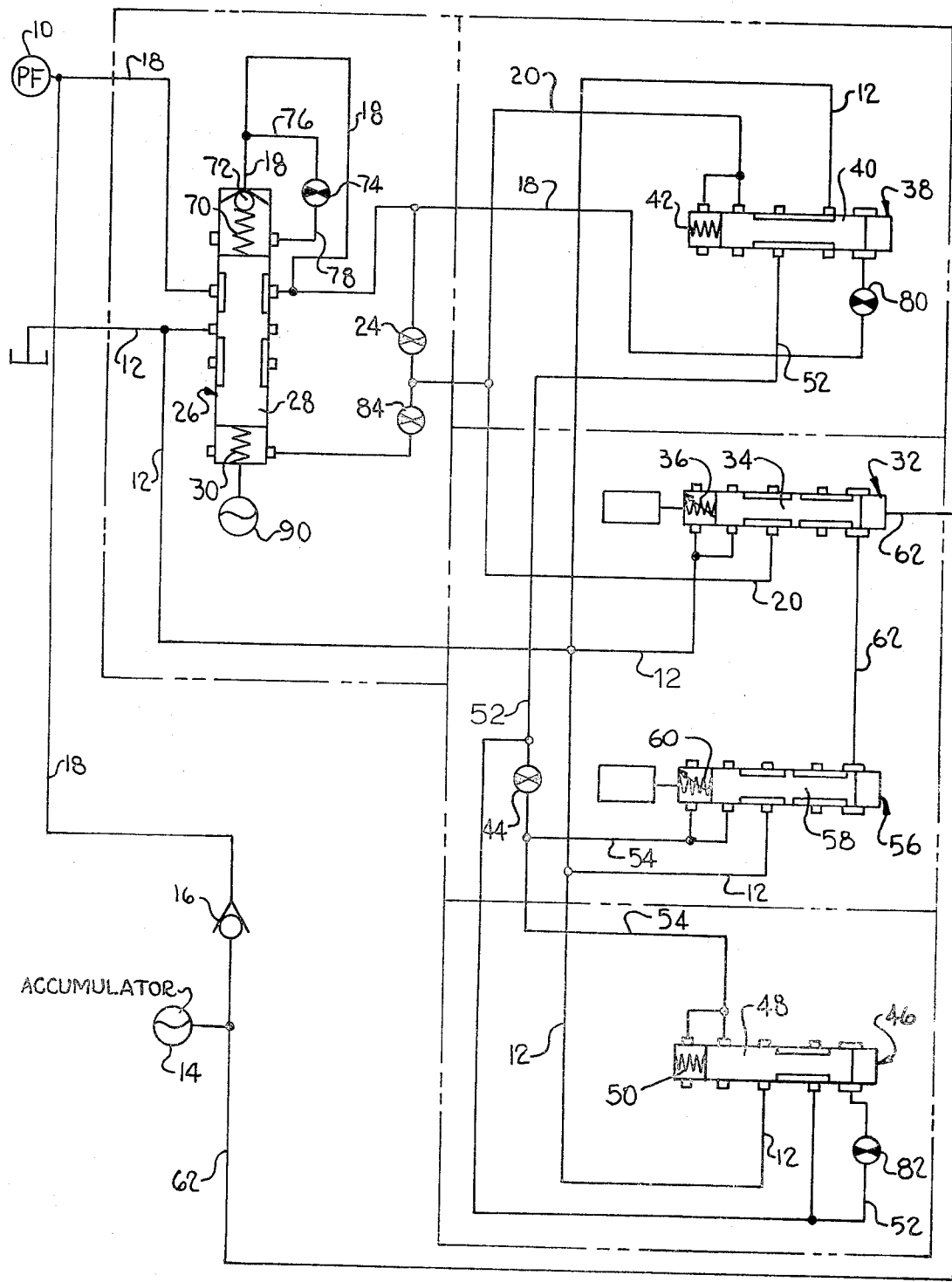
FIG. 1 is a diagrammatic view of a hydraulic system including a variable differential unloading apparatus constructed in accordance with the present invention.

Referring in detail to the drawings, the diagrammatic view of FIG. 1 illustrates a fixed displacement pump 10 for supplying pressurized fluid to a system constructed in accordance with the present invention. Pump 10 communicates with an energy storing device or accumulator 14 via a line 18 and check valve 16, and thence to a line 62 which in turn communicates with the system to be controlled.

The outlet of pump 10 also communicates with an unloading valve means indicated generally at 26 which in its normal state is closed by a bias spring 30 acting upon spool 28 whereby pump 10 is isolated from reservoir line 12. That is, pump 10 normally delivers flow to accumulator 14 until the flow is diverted by the pressure control mechanism to reservoir 12. When pump 10 is unloaded through unloading valve means 26 to reservoir 12 the pressure in line 62 at accumulator 14, as well as the pressure in the system, will be held at maximum or preset level by the action of check valve 16 which prevents reverse flow.

The entire purpose of the unloading system is to measure the system pressure at accumulator 14 via line 62 and to communicate this pressure information to a trigger mechanism which will perform an unload or firing action on the unloading valve 26 forcing it to its open position. Also, when the system pressure in line 62 drops to a preset level there will be a reset action which forces unloading valve 26 to close against the action of bias spring 30.

Tracing the action of the variable differential unloading, assume for example a high pressure sensing valve means 32 is set at say 1500 p.s.i. This is done by manually adjusting the bias of a spring 36 so as to require 1500 p.s.i. at line 62 to move the spool lands so that there is a communication across the lands of spool 34 from line 20 to reservoir line 12. As the system pressure in line 62 rises to the 1500 p.s.i. level flow begins from line 20 to line 12 across spool element 34. This means that flow will occur from line 18 to line 20 through orifice 24 developing a pressure drop across this orifice.

Such pressure drop across orifice 24 is also across three-way switch valve means 38 via lines 18 and 20 and spool 40 of such switch valve means is biased closed by a spring 42 that provides a bias of 50 p.s.i. Unloading valve 26 is biased at 100 p.s.i. Hence there will be no flow across unloading valve 26 until the pressure drop across orifice 24 has reached 100 p.s.i. Switch valve means 38, however, will have been fully opened by that time since the bias of spring 42 is only 50 p.s.i.

In operation, as the pressure builds up in line 62 and high pressure sensing valve means 32 draws more flow through orifice 24 there is complete unbalance of forces on switch valve means 38 which causes its spool 38 to assume a full open position before the unloading valve spool 28 can move against its 100 p.s.i. bias spring 30.

At this time it should be pointed out that line 52 will be effectively connected to reservoir line 12 through a pilot flow limiting valve means 46 and a low pressure sensing valve means 56 in a manner later to be described. However, as the valve spool 40 in switch valve means 38 is moved to the open position, connecting line 20 to line 52, then line 20 is also connected to reservoir 12. When this occurs excessive control flow will generate through orifice 24 and the previously mentioned 100 p.s.i. pressure drop will occur across orifice 24 and unloading valve means 26 forcing its spool 28 to the fully open position since line 20 has been vented to reservoir 12 and the pressure in line 18 will rise to and exceed the 100 p.s.i. required to overcome bias spring 30. The pump is now unloaded from pressure line 18 to reservoir line 12.

Reference will now be made to the events that lead up to connecting line 62 to reservoir 12. Assume that the system pressure is rising in line 62 to the previously stated setting of 1500 p.s.i. on high pressure sensing valve means 32 due to the pump charging accumulator 14. Such pressure in line 62 is communicated to low pressure sensing valve means 56 which was set at 1400 p.s.i. by adjusting the force of bias spring 60. Therefore as the pressure in line 62 is rising, spool 58 in low pressure sensing valve means 56 which was set at 1400 p.s.i. by continues to remain open until pressure in line 62 approaches 1500 p.s.i. In a sense spool 58 is excessively opened and has essentially measured line pressure all the time. However, spool 58 will not return to a closed position until the pressure in line 62 drops to 1400 p.s.i. This can be thought of as a memory type of function for low pressure sensing valve means 56 since it opens and returns to a closed position at some preset pressure, namely 1400 p.s.i.

Now when low pressure sensing valve means 56 is in its open position, as the pressure approaches 1500 p.s.i. line 54 is connected to reservoir line 12 by the opening of spool 58. Since line 54 is connected to reservoir, flow through orifice 44 and therefore line 52 occurs. As fluid passes through orifice 44 the pressure drop across orifice 44 opposes the bias spring 50 in pilot flow limiting valve means 46 causing spool 48 to take a full open position thereby connecting line 52 to line 12 in that section.

It will now be understood that line 52 is connected to reservoir line 12 via pilot flow limiting valve means 46, and also via orifice 44, line 54, and open spool 58 of low pressure sensing valve means 56. These conditions have occurred due to the fact that low pressure sensing valve means 56 was measuring the pressure at the same place in the circuit as high pressure sensing valve means 32, and assumed an open position just prior to the unloading action that was caused by high pressure sensing valve means 32. Therefore switch valve means 38 is certain to open to reservoir line 12 when it unloads or fires from the action of high pressure sensing valve means 32.

Another point to be mentioned with respect to the connection of line 52 to reservoir line 12 just prior to firing is that low pressure sensing valve means 56 has a regenerative feed-back connection from line 54 to the chamber of its bias spring 60. This is communicated to reservoir line 12 as the pressure in line 62 is rising so that the spool 58 is free to move back against bias spring 60 and assume its full open position. This is insured just prior to unloading by the fact that line 54 is connected to line 52 through orifice 44 at all times, and spool 40 in switch valve means 38 communicates in its normally closed position to reservoir line 12 so that the conditions for having minimum pressure in the spring chamber of low pressure sensing valve means 56 are preserved just prior to the unloading action.

With the pump 10 in its unloaded state, having reached 1500 p.s.i., and with switch valve means 38 in its open position, lines 52 and 20 are connected to reservoir line 12. Assuming the pressure in accumulator 14 is dropping due to system conditions at this point the flow through orifice 24 and therefore through line 20 is still maintained even though the high pressure sensing valve means 32 has closed when the pressure drops slightly for example to 1490 pounds. Therefore, the system remains unloaded as the pressure in line 20 is effectively communicated to reservoir 12 through switch valve means 38. Also, there is a control flow through line 52 that comes from orifice 24 which flow is divided in a percentage manner such that there is a very small portion of the flow through orifice 44, line 54, and low pressure sensing valve means 56 to reservoir line 12. A major high portion of the flow is diverted through pilot flow limiting valve means 42 to reservoir line 12.

It should be mentioned that such low flow through orifice 44 which passes through low pressure sensing valve means 56 is very important to the reset. When the system pressure in line 62 drops to just above 1400 p.s.i. where the low pressure sensing valve means 56 will effectively close, there is a rapid build-up of pressure in line 54 because this low flow is restricted by spool 58, in a very small manner to begin with, and is fed back to the chamber of spring 60 and tends to continue pushing spool 58 closed in a regenerative manner. In essence, the pressure in line 54 plus the force of spring 60 are now opposing the pressure in accumulator 14 and as the pressure rises in line 54 the spool 58 will snap shut under an overwhelming build-up of pressure.

With spool 58 closed no fluid can flow through orifice 44 which means that the pressure in line 52 and line 54 equalize and bias spring 50 will now close spool 48 of pilot flow limiting valve means 46. This action also rejects all flow in line 52 whereby no further flow can occur through orifice 44. Now with the flow terminated through orifice 44 there can be no pressure drop across orifice 24 and therefore pressure is equalized in lines 18 and 20 and bias spring 30 closes spool 28 of unloading valve 26. This immediately isolates the pump flow from reservoir line 12 and diverts it to accumulator 14 through check valve 16 and the whole previously described cycle of pressure buildup occurs again.

As the pressure builds up in accumulator 14, the pressure in line 62 is once again communicated to the high and low pressure sensing valve means 32 and 56.

Referring next to three way switch valve means 38, when the flow through orifice 24 is terminated because of the closing of pilot flow limiting valve means 46, it is also true that the pressure drop across orifice 24 is also across switch valve means 38 and if the pressure in lines 18 and 20 equalizes then the switch valve means 38 also closes under the action of its bias spring on spool 40. This again connects line 52 to reservoir line 12 and the back side of low pressure sensing valve means 56 which is ready to reopen. Now as the system pressure in line 62 rises again from its 1400 p.s.i. loading point, low pressure sensing spool 58 is again moved against spring 60 to a wide open position which sets the conditions for connecting line 54 to reservoir via line 12 in the manner as previously described. The pressure continues to rise in line 62 measured by high pressure sensing valve means 32 until flow once again occurs through high pressure valve means 32 and orifice 24. Pressure drop is once again generated across orifice 24 which actuates switch valve means 38 to the full open position forcing an unload to occur.

It will now be understood that in a small sequence of events there is effected a control operation wherein two separate sensing valve means have measured the pressure in the system to be controlled. The low pressure sensing valve means has gone through a full open position and returned to a closed position after certain other events have occurred. Hence the system can be said to have a "memory" as it will return to the predetermined lower pressure setting to perform its shut-off function. Also, the high pressure sensing valve means momentarily opens at its predetermined setting to draw a signal flow and force an unloading condition to occur. Now when the system pressure drops, the high pressure sensing valve means will close but will not effect the unloaded condition because a switch valve means has performed the unloading and is holding.

It will now be seen that there are two sensing valve means that also function as preamplifiers drawing control flows or setting control flows independently, and these functions are forced to occur in a logical sequence of events. That is to say event number one cannot occur until event number two occurs, as dictated either by force level in the springs or land positions on the spools. This means that interaction between the separate functions cannot occur except in a predetermined controlled manner, and that wild oscillation or predetermined triggering cannot occur due to variations in flow rates, friction or any other system condition.

The logic switch valve means 38 actually performs a decking function of allowing low pressure sensing valve means 56 to set properly and then switches itself to unload the unloading valve 26. Also, pilot flow limiting valve means 46 is shielding low pressure sensing valve means 56 so that excessive flow cannot occur through such valve means and cause false triggering. Such pilot flow limiting valve means 46 also maintains a minute pilot flow to orifice 24 so that the accuracy and precise triggering characteristics can be accomplished with a very low flow through low pressure sensing valve means 56. These functions are extremely important and can be separated with respect to their contributions to the pilot triggering mechanism.

Reference is next made to damping functions of the variable differential apparatus that are supplemental to the main circuit operation just described.

Referring again to FIG. 1, pump 10 delivers fluid to the inlet side of unloading valve 26, and flow through the valve is delivered via line 18 and check valve 72 to the top end of spool 28, said check valve 72 being normally biased closed by a spring 70. When flow occurs in line 18 check valve 72 opens allowing spool 28 to be opened by fluid pressure on its top end against the closing action of bias spring 30. However, when spool 28 tends to reverse under the force of spring 30, and pressure applied at the bottom end of the spool, its reverse movement is restricted by damping orifice 74 since exit flow from the spring chamber is checked by the action of the check valve element 72. This effectively provides a really fast opening characteristic for spool 28, with a retarded slow resetting or closing movement. This arrangement serves to eliminate chatter and wild oscillation that might otherwise be produced by parasitic forces such as jet forces or the like.

Reference is next made to an orifice 84 located between lower spring chamber for bias spring 30 and line 20. Such orifice 84 also provides a damping action in the other direction and is utilized for eliminating chatter. It should be mentioned that the spring chamber for bias spring 30 encloses a volume of oil generally indicated as 90 that provides a capacitance or resiliency on the bottom of the spool 28. It will be understood that such resiliency is not completely spongy since oil is of low compressibility, and during the opening movement of spool 28 it can be made to move rather rapidly due to the capacitance of the volume of oil in chamber 90, the oil not being permitted to flow through orifice 84 to the sensing valve means.

Pulsations such as pump pulsations that may effect spool stability when they are freely allowed to pass to the ends of the spool, can cause chatter. To prevent this dome 90 being full of oil acts as a capacitor on the bottom of the spool, and orifice 84 functions as a high resistance. Hence such resistance/capacitance network tends to filter pulses and provide additional stability for spool 28. It will now be seen there is free flow into the top spring chamber of spool 28 for rapid movement, and retarded flow for control reset, and a resistance/capacity network on the bottom spool 28 which tends to give stability by eliminating pulses, and to decelerate spool 28 from its rapid movement.

In the sensing portions of the system such as in the switch valve means 38, damping is provided by an orifice 80 on the pilot side that tends to open the spool from line 18. There is a chamber of oil on the end of spool 80 in this region that provides a high resistance/capacitance network that delays pressure build-up on the end of the spool. This is advantageous in the switching action to make it more positive and less susceptible to false pulse triggering from pump pulses and other parasitic effects. That is, spool 40 will respond primarily to slower varying pressures.

The other resistance/capacitance network in the system is provided by an orifice 82, working in conjunction with an oil chamber on the right end of spool 48 of pilot flow limiting valve means 46. Here again damping orifice 82 which is serviced by line 52 on the upstream side of orifice 44, is a primary detector damping line whereby the pilot flow limiting valve means 46 is protected from sudden flow increases or pulses in the line. This tends to stabilize valve means 46 against chattering and false triggering. For example, when switch valve means 38 fires a delay occurs so that the spool will not actuate too fast, and so that oscillation will not occur.

The damping orifices 80, 82 and 84 just described are not functionally involved in the sequence of operation of the various valve means that effect the variable differential functions, other than to provide stability and shield out various pulses as described.

The control orifices 24 and 44 are, however, the functional orifices that provide the previously described sequences of operation within the valve. Such orifices 24 and 44 actually provide the required control flows.

Figure 3:
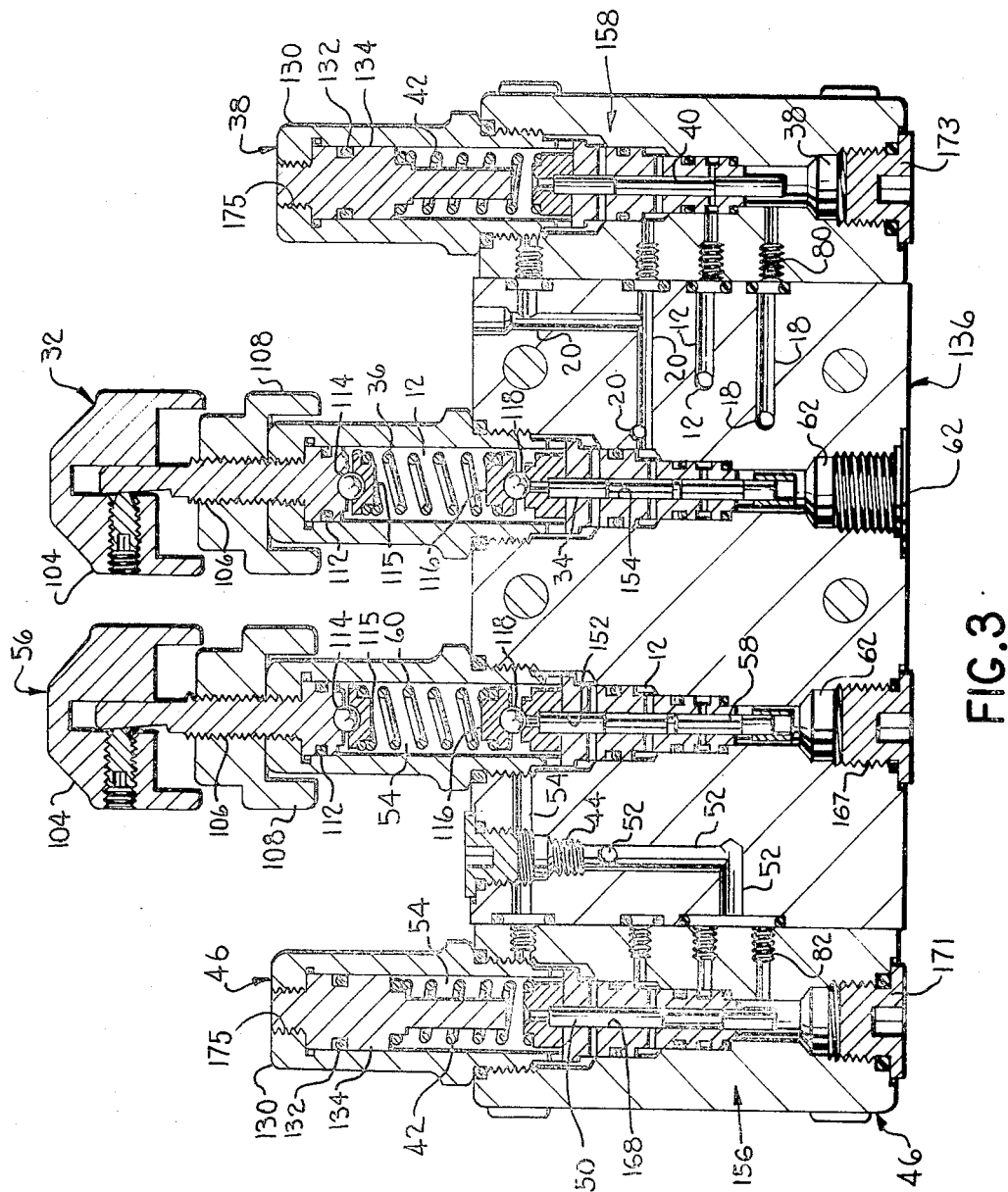
FIG. 3 is a front sectional view of the variable differential unloading apparatus of FIG. 1, the section being taken along a vertical plane through the centers of high and low pressure sensing valve portions of said apparatus.
Figure 8:
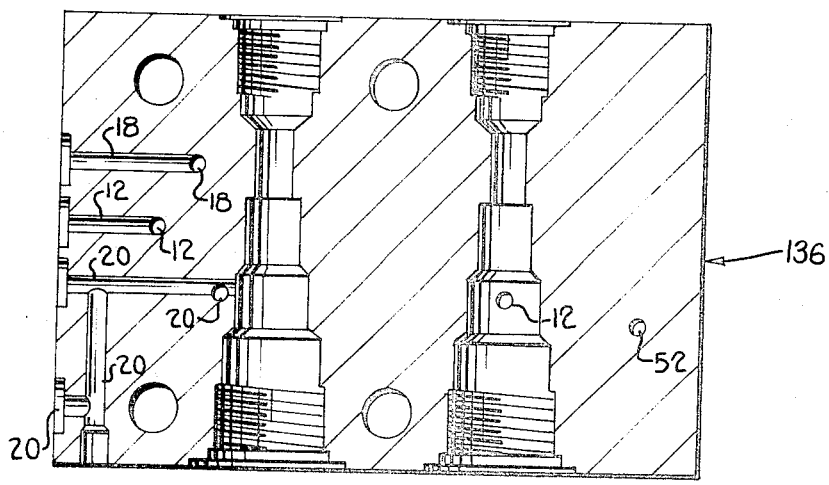
FIG. 8 is a sectional view of the housing for sensing valve portions of the apparatus of the preceding figures the section being taken along the line 8—8 of FIG. 4.
Figure 9:
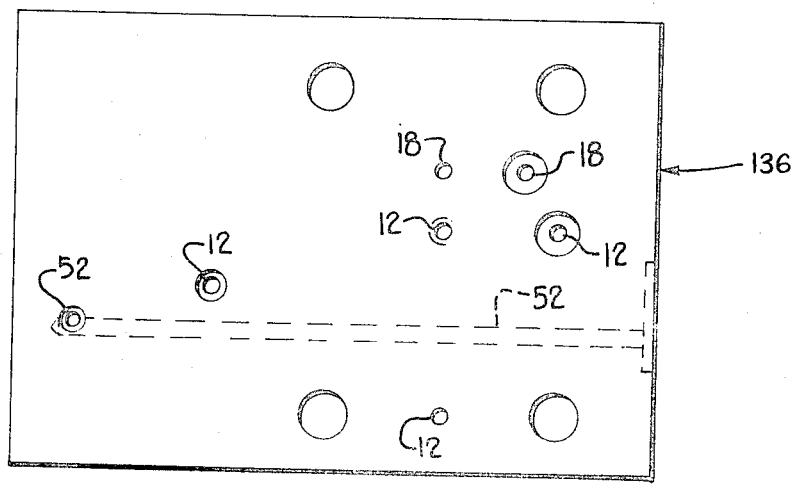
FIG. 9 is a rear elevational view of the housing for sensing valve portions of the apparatus of the preceding figures.
Figure 10:
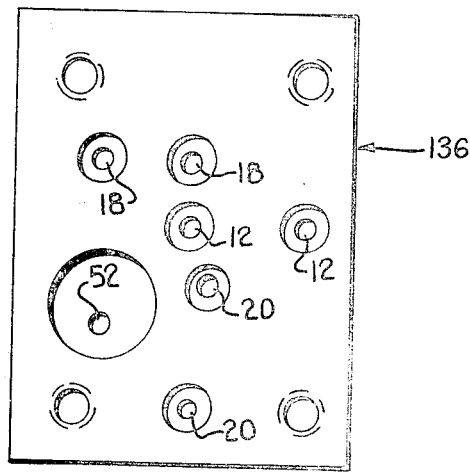
FIG. 10 is a left side elevational view of the housing of FIGS. 4–9.
Figure 11:
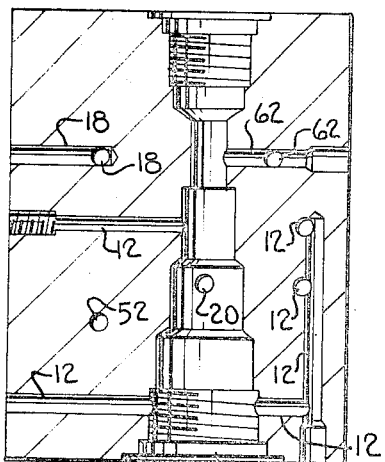
Figure 12:
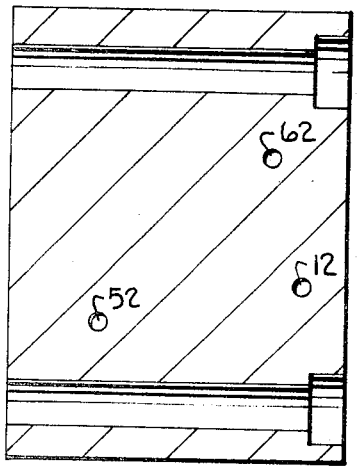
Figure 13:
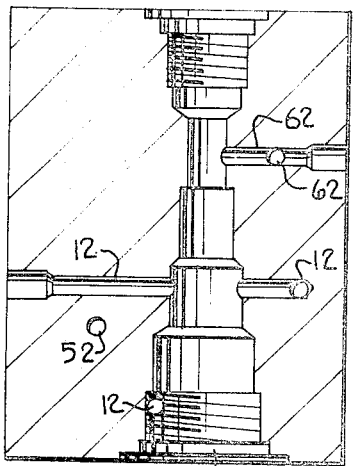

Reference is next made to FIGS. 2 and 3 which are sectional views illustrating the actual mechanical structure of the variable differential unloading apparatus of the present invention.

Here it will be noted that the previously described main unloading valve means 26 includes a body portion 100 and a dome 102 that forms the accumulator chamber 90 for containing an oil volume. Also, spring 30 is provided with a retainer 103 that is engaged by one of the ends of the unloading valve spool 28, the other end of spool 28 including inlet check valve element 72 that is biased through its closed position by the spring 70. A chamber 78 is closed by a removable plug 161.

Referring again to FIGS. 2 and 3, the previously described control valve means 32, 38, 46, and 56 are illustrated in sections so as to reveal in detail the interior components. It will be noted that each of the low pressure and high pressure sensing valve means 32 and 56 are provided with manually adjustable knobs 104 and 105 which are mounted on stems 106 that carry calibrated dials 108, the lower ends of said stems including sliding seals 112 that engage the bore of tubular valve housings 163.

The previously described bias springs 36 and 60 each include upper spring retainers 115 and lower spring retainers 116, the former being provided with ball and socket alignment connections 114 for the upper end of the springs and ball and socket alignment connections 118 for the lower ends of the springs.

With continued reference to FIG. 3 it will be noted that the lower ball and socket alignment connections 118 engage the ends of spools 34 and 58, the latter being slidably disposed in respective bores 154 and 152.

With continued reference to FIGS. 2 and 3, the lower end of bore 152 is closed by a removable plug 167 and the lower end of bore 154 is provided with a spool and inlet port for a line 62.

Reference is next made to the pilot flow limiting valve means 46 shown in FIG. 3 which includes a body portion 156 including a tubular spring housing 130 provided with an adjustable upper spring retainer 134, the latter including a sliding seal 132 engaging the bore of member 130.

As seen in FIG. 3, previously described spool 48 of pilot flow limiting valve means 46 is slidably disposed in a bore 168 in body portion 156 and, referring to the other side of the assembly of FIG. 3, spool 40 of the switch valve means 38 is slidably disposed in a bore 169 in body portion 158. The bottoms of these bores are closed by removable plugs 171 and 173.

It will be further noted that switch valve means 38 includes a tubular spring housing 130, an adjustable spring retainer 134 and an associated sliding seal 132 in the same manner as the pilot flow limiting valve means 46.

It should now be mentioned that these spring retainers 134 can be adjusted due to the threaded engagement at 175 between the spring retainers 134 and the tubular spring housings 130 and 134.

Due to the rather complex passage and porting arrangement of the compact control assembly of the present invention a relatively large number of sectional views have been included as will be seen in FIGS. 10 through 19, along with the elevational views of the main valve body 136 shown in FIGS. 4 through 10.

In these various elevational and sectional views all the passages and ports shown in FIGS. 1 through 3 have been designated with corresponding numerals so that the diagrammatic view of FIG. 1 can be accurately related to the assembly structural views of FIGS. 2 and 3.

I claim:

1. A variable differential unloading apparatus for a hydraulic system comprising, in combination, unloading valve means including an inlet communicating with a source of pressurized fluid, a first outlet for discharging said pressurized fluid to reservoir, a first control port connected to said inlet, and a second control port; low pressure sensing valve means in circuit with said unloading valve means and including a spool element and an adjustable low pressure spool bias spring; high pressure sensing valve means in circuit with said unloading valve means and including a spool element and an adjustable high pressure spool bias spring; three way switch valve means in circuit with said unloading valve means; pilot flow limiting valve means in circuit with said unloading valve means for limiting the flow to the low pressure sensing valve means; an energy storing device including an inlet communicating with fluid pressure on spool ends of said low and high pressure sensing valve means, said energy storing device inlet also being in communication with fluid from said source of pressurized fluid upstream of said inlet of said unloading valve means; inlet check valve means for said energy storing device inlet between said source and said energy storing device inlet; and a pressure drop orifice for permitting a control flow from said inlet of said unloading valve means to said second control port, said three way switch valve means including a first control port communicating with said flow upstream of said orifice means and a second control port communicating with said inlet of said unloading valve means downstream of said orifice means.

2. The apparatus defined in claim 1 wherein said unloading valve means includes first and second spool ends, said first spool end including a bias spring means, and said second spool end including an inlet communicating with said control flow from said second control port of said unloading valve means.

3. The apparatus defined in claim 1 wherein said unloading valve means includes first and second spool ends, said first spool end including a bias spring means, and said second spool end including an inlet communicating with said control flow from said second control port of said unloading valve means; and an inlet check valve and outlet orifice for said spool end inlet.

4. A variable differential unloading apparatus for a hydraulic system comprising, in combination, unloading valve means including an inlet communicating with a source of pressurized fluid, a first outlet for discharging said pressurized fluid to reservoir, a first control port connected to said inlet, and a second control port; an energy storing device including an inlet communicating with said source of pressurized fluid; orifice means for permitting a control flow from said inlet of said unloading valve means to said second control port; high pressure sensing valve means including an inlet communicating with said second outlet of said unloading valve means downstream of said orifice means, a first outlet communicating with reservoir, a first spool end, and a second spool end including a port communicating with said inlet of said energy storing device; high pressure bias spring means for said first spool end of said high pressure sensing valve means; adjusting means for said high pressure bias spring means; three-way switch valve means including a first port communicating with said second control port of said unloading valve means downstream of said orifice means, a second port communicating with reservoir, a third port, and first and second spool ends; bias spring means for said first spool end of said three-way switch valve means; pilot flow limiting valve means including a first port communicating with said third port of said three-way switch valve means, a second port communicating with reservoir, a third port, and first and second spool ends; bias spring means for said first spool end of said pilot flow limiting valve means; low pressure sensing valve means including a first port communicating with said third port of said pilot flow limiting valve means, a second port communicating with reservoir, a third port communicating with said inlet of said energy storing device, and first and second spool ends; low pressure bias spring means for said first end of said low pressure sensing valve means; and adjusting means for said low pressure bias spring means.

5. A variable differential unloading apparatus for a hydraulic system comprising, in combination, an unloading valve means including an inlet for communication with a source of pressurized fluid, a first outlet communicating with reservoir, a first control port connected to said inlet, and a second control port, a spool element for selectively connecting said inlet with either of said outlets, said spool element including first and second spool ends, a first spool end inlet port communicating with said first spool end, and a second spool end inlet port; an energy storing device including an inlet for communication with said source of pressurized fluid; high pressure sensing valve means including an inlet communicating with said second control port of said unloading valve means, an outlet communicating with reservoir, a spool element for connecting said inlet and outlet and including first and second spool ends, a first spool end inlet port communicating with said first spool end, a second spool end inlet port communicating with said second spool end, and an adjustable spool bias spring engaging said first spool end; first conduit means connecting said second spool end inlet port of said high pressure sensing valve means with said inlet of said energy storing device; second conduit means connecting said first spool end inlet port with reservoir; first orifice means between said second outlet of said unloading valve means and said inlet of said high pressure sensing valve means; three-way switch valve means including in inlet, a first outlet communicating with said inlet of said high pressure sensing valve means, a second outlet communicating with reservoir, a spool element for selectively connecting said inlet with either of said outlets and including first and second spool ends, a first spool end inlet port communicating with said first spool end and with said first outlet of said three-way switch valve means, a second spool end inlet port communicating with said second control port of said unloading valve means, and a spool bias spring engaging said first spool end; low pressure sensing valve means including an inlet, an outlet communicating with reservoir, a spool element for connecting said inlet with said outlet and including first and second spool ends, a first spool end inlet port communicating with said first spool end and said inlet of said low pressure sensing valve means, a second spool end inlet port communicating with said second spool end inlet port of said high pressure sensing valve means, and an adjustable spool bias spring engaging said first spool end; pilot flow limiting valve means including an inlet, an outlet communicating with reservoir, a spool valve element for connecting said inlet and outlet and including first and second spool ends, a first spool end inlet port communicating with said first spool end, a second spool end inlet port communicating with said second spool end; third conduit means connecting said first spool end inlet port of said pilot flow limiting valve means with said inlet of said low pressure sensing valve means; fourth conduit means connecting said inlet and said second spool end inlet port of said pilot flow limiting valve means with said inlet of said three-way switch valve means; second orifice means in said fourth conduit means between said second spool end inlet port of said pilot flow limiting valve means and said inlets, fifth conduit means including a third orifice means connecting said third and fourth conduit means; sixth conduit means including a fourth orifice means connecting said first spool end inlet port of said unloading valve means with the downstream side of said first orifice means; and seventh conduit means connecting said second control port of said unloading valve means with said second spool end inlet port of said unloading valve means.

6. The apparatus defined in claim 5 that includes an inlet check valve and an outlet orifice for said second spool end inlet port of said unloading valve means.

7. The apparatus defined in claim 5 that includes an inlet check valve for the flow of fluid from said source of pressurized fluid to said inlet of said energy storing device.

8. A variable differential unloading apparatus for a hydraulic system comprising, in combination, unloading valve means for effecting the charging and discharging of pressurized fluid to and from said system; high pressure sensing valve means responsive to pressure of said system for controlling said unloading valve means to effect said discharging of fluid from said system; low pressure sensing valve means responsive to pressure of said system for controlling said unloading valve means to effect said charging of fluid to said system; and a switch valve means for determining which one of said two sensing valve means is controlling said unloading valve means.

9. The apparatus defined in claim 8 wherein said switch valve means is hydraulically actuated to a first position by operation of the high pressure pilot and to a second position by operation of the low pressure pilot.

10. The apparatus defined in claim 8 which includes a pilot flow limiting valve means for controlling a pilot flow through said low pressure sensing valve means.

References Cited

UNITED STATES PATENTS

| | | | |
|---|---|---|---|
| 2,214,816 | 9/1940 | Harrington | 60—51 XR |
| 3,171,254 | 3/1965 | Leduc | 60—51 |

EDGAR W. GEOGHEGAN, Primary Examiner